(12) United States Patent
Downes et al.

(10) Patent No.: US 7,931,125 B2
(45) Date of Patent: Apr. 26, 2011

(54) SHAFT SEAL WITH LUBRICATION DEVICE

(75) Inventors: Michael D. Downes, Woodinville, WA (US); Robert P. LaPlante, Gilford, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 1119 days.

(21) Appl. No.: 11/283,581

(22) Filed: Nov. 18, 2005

(65) Prior Publication Data

US 2006/0071430 A1 Apr. 6, 2006

Related U.S. Application Data

(63) Continuation-in-part of application No. 10/150,886, filed on May 16, 2002, now Pat. No. 6,997,285.

(60) Provisional application No. 60/291,295, filed on May 16, 2001, provisional application No. 60/351,560, filed on Jan. 24, 2002.

(51) Int. Cl.
*F16J 15/32* (2006.01)
(52) U.S. Cl. .................. 184/6.18; 277/551; 277/559
(58) Field of Classification Search ............ 184/5, 6.17, 184/6.18, 9, 19; 277/343, 351, 372, 549, 277/559, 908, 551, 572
See application file for complete search history.

(56) References Cited

U.S. PATENT DOCUMENTS

| | | | | |
|---|---|---|---|---|
| 2,997,318 | A | * | 8/1961 | Lansky et al. ............ 277/558 |
| 3,511,512 | A | * | 5/1970 | Wheelock ............... 277/564 |
| 3,586,342 | A | * | 6/1971 | Staab ..................... 277/559 |
| 3,868,105 | A | * | 2/1975 | Bentley ................... 277/559 |
| 3,873,104 | A | * | 3/1975 | Bainard ................... 277/559 |
| 3,923,315 | A | * | 12/1975 | Hadaway ................. 277/559 |
| 3,984,113 | A | * | 10/1976 | Bentley ................... 277/559 |
| 4,493,490 | A |   | 1/1985 | Ohma |
| 4,750,747 | A | * | 6/1988 | Holzer .................... 277/559 |
| 4,815,763 | A |   | 3/1989 | Hartmann |
| 5,472,072 | A |   | 12/1995 | Bumgarner |
| 5,477,949 | A |   | 12/1995 | Forster et al. |
| 5,529,155 | A |   | 6/1996 | Jones et al. |
| 5,531,299 | A |   | 7/1996 | Bataille |
| 5,906,047 | A |   | 5/1999 | Miller et al. |
| 5,913,548 | A |   | 6/1999 | Keck |
| 6,004,039 | A |   | 12/1999 | Yabe et al. |
| 6,035,969 | A |   | 3/2000 | Pyle |
| 6,073,933 | A |   | 6/2000 | Johnston |
| 6,158,559 | A |   | 12/2000 | Asa et al. |

(Continued)

*Primary Examiner* — David D Le
*Assistant Examiner* — Terry Chau
(74) *Attorney, Agent, or Firm* — Ronald W. Wangerow, Esq.; Harness, Dickey & Pierce, P.L.C.

(57) ABSTRACT

A shaft seal assembly for use with a reciprocating or rotating shaft includes a shaft seal, a lubricant-storing ring, and a retainer. The retainer and ring can be formed as a subassembly and then combined with a shaft seal. The seal includes an annular body portion, a first sealing lip portion, and a first pocket portion. The first sealing lip portion has a substantially uniform axial dimension and is adapted to sealingly engage a shaft. The first pocket portion includes a plurality of pockets, each having an opening toward the first sealing lip portion. The plurality of pockets are each adapted to collect a working fluid when the shaft axially displaces in a first direction and to dispense the working fluid when the shaft axially displaces in a second direction. The assembly provides a lubricated shaft and seal that improves the effective life of the shaft seal.

29 Claims, 10 Drawing Sheets

U.S. PATENT DOCUMENTS

| | | |
|---|---|---|
| 6,234,505 B1 | 5/2001 | Ito |
| 6,328,292 B1 | 12/2001 | Jarstad |
| 6,726,211 B1 * | 4/2004 | Kuroki et al. ................ 277/353 |
| 2001/0045721 A1 | 11/2001 | Heydenreich |
| 2002/0092722 A1 | 7/2002 | Hosoda et al. |
| 2003/0001358 A1 | 1/2003 | Becker et al. |
| 2003/0011134 A1 | 1/2003 | Frauhammer et al. |
| 2003/0019692 A1 | 1/2003 | Downes et al. |
| 2003/0155718 A1 | 8/2003 | Lewis et al. |

\* cited by examiner

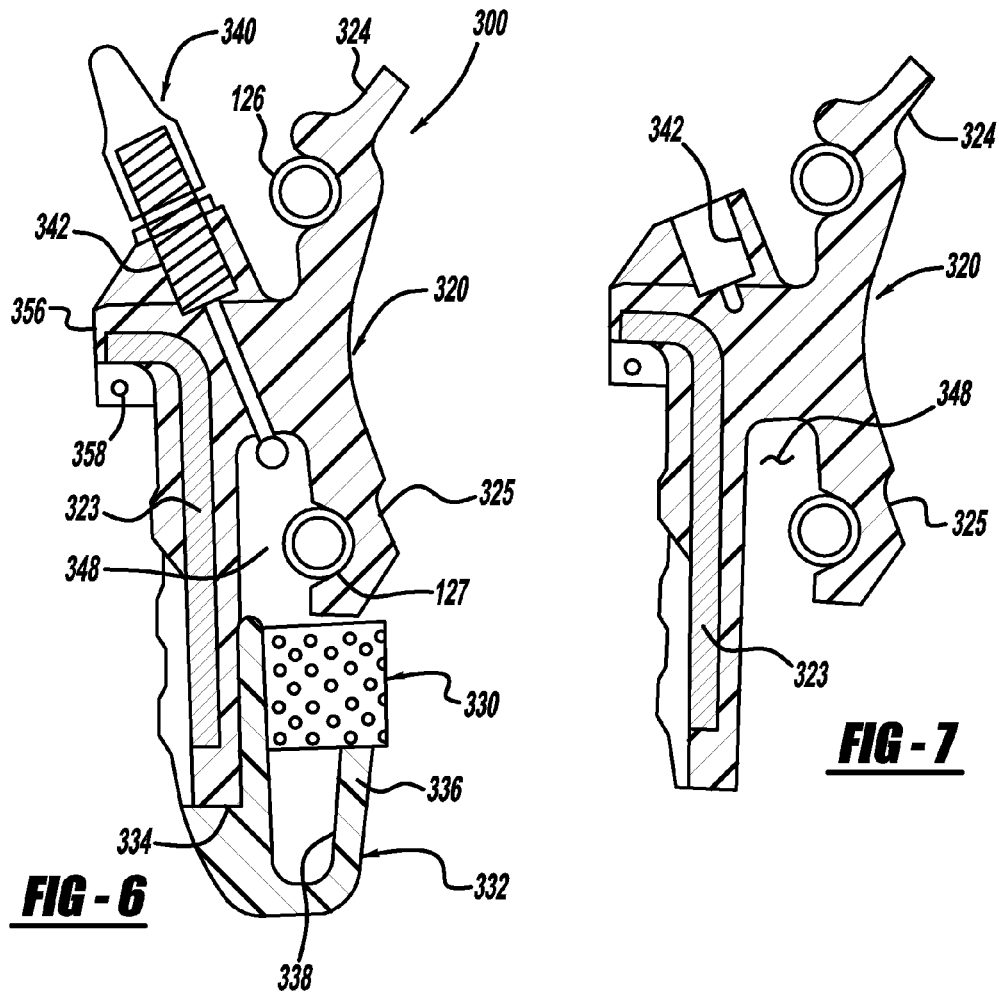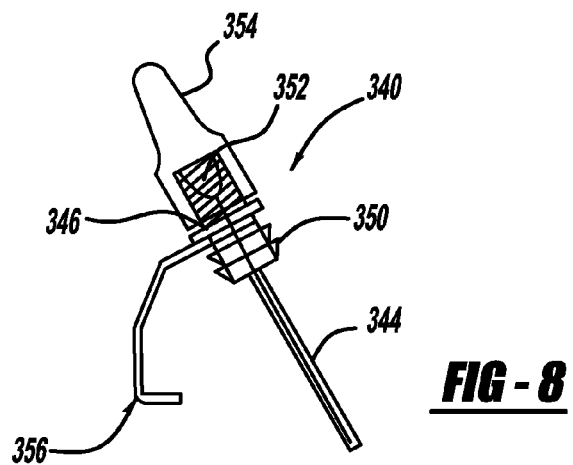

SHAFT SEAL WITH LUBRICATION DEVICE

CROSS-REFERENCE TO RELATED APPLICATIONS

This application is a continuation-in-part of U.S. patent application Ser. No. 10/150,886 filed on May 16, 2002 (now U.S. Pat. No. 6,997,285) which claims the benefit of U.S. provisional patent applications identified as Application No. 60/291,295, filed May 16, 2001 and Application No. 60/351,560, filed Jan. 24, 2002. The disclosure of the above application is incorporated herein by reference.

FIELD OF THE INVENTION

The present invention relates in general to seals for reciprocating and rotating shafts. In particular, this invention relates to a shaft seal having a lubricant-storing ring and a device for delivering lubricant to the ring. The shaft seal also includes a plurality of pockets for collecting and dispensing a lubricating fluid in response to reciprocal axial displacement of the shaft.

BACKGROUND OF THE INVENTION

Seals for use with reciprocating or rotating shafts are susceptible to debris and contaminants. The accumulation of debris at an outer portion of a seal can damage a seal and reduce its effective life.

A suspension fork is oftentimes used on a motorcycle or a mountain bicycle. A shaft is permitted to reciprocate with respect to the fork to absorb road inputs. A seal is provided at the outer boundary of the suspension fork that retains lubricant within the fork and permits the shaft to reciprocate. A problem with a flexible seal, however, is that heat created by friction between the shaft and seal tends to weaken its structure. Thus, it is important to sufficiently lubricate the seal to decrease the aforementioned, as well as other deficiencies.

SUMMARY OF THE INVENTION

The present invention includes a seal for use with a reciprocating or rotating shaft. The seal can be used on a suspension fork of a motorcycle, a mountain bike, or other systems with dynamic components requiring sealing. The seal includes a lubrication device that improves the effective life of the seal. The seal also includes an external lip for preventing the accumulation of debris.

In a preferred embodiment, a shaft seal assembly for use with a reciprocating or rotating shaft includes a shaft seal, a lubricant-storing ring, and a retainer. The retainer and ring can be formed as a subassembly and then combined with a shaft seal. The assembly provides a lubricated shaft and seal that improves performance and the effective life of the shaft seal.

The present invention provides a hydraulic seal including an annular body portion, a first sealing lip portion, and a first pocket portion. The first sealing lip portion has a substantially uniform axial dimension and is adapted to sealingly engage a shaft. The first pocket portion includes a plurality of pockets, each having an opening toward the first sealing lip portion. The plurality of pockets are each adapted to collect a working fluid when the shaft axially displaces in a first direction and to dispense the working fluid when the shaft axially displaces in a second direction.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a cross-sectional view of a shaft seal assembly according to yet another embodiment of the present invention;

FIG. 7 is a cross-sectional view of the shaft seal portion of the shaft seal assembly shown in FIG. 6;

FIG. 8 is a plan view of the lubrication injection device according to the principles of the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 1:
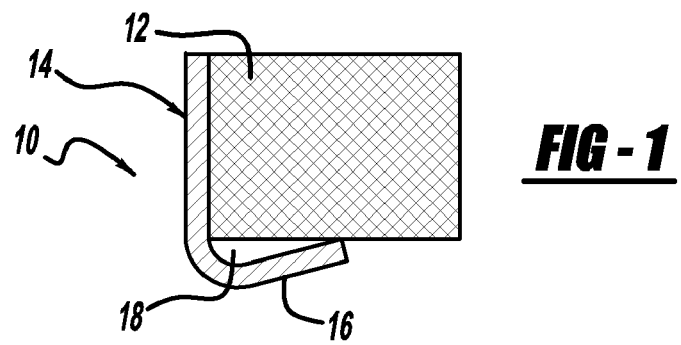
FIG. 1 is a sectional view of a portion of a ring and retaining clip subassembly according to the principles of the present invention.
Figure 2:
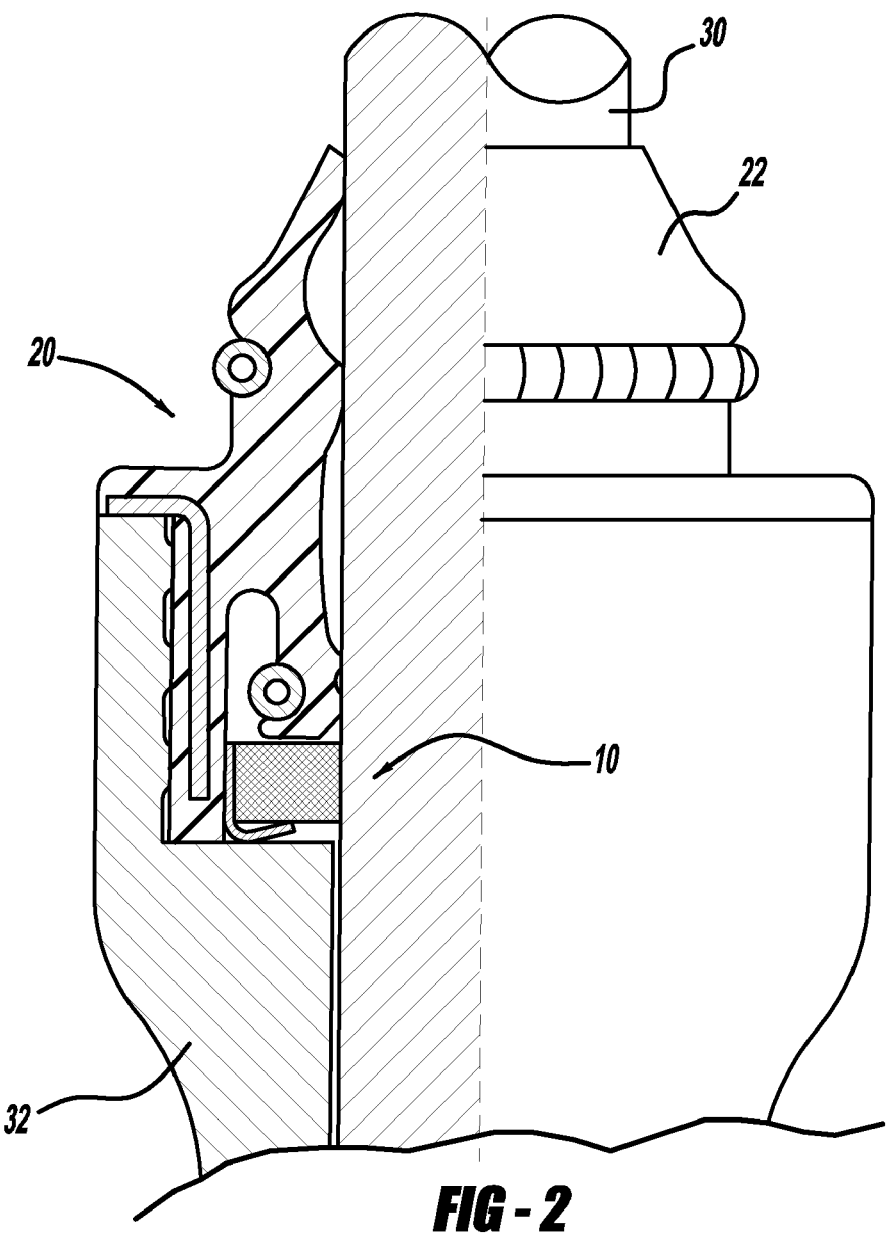
FIG. 2 is a partially sectional view of a shaft seal incorporating the ring and clip subassembly of FIG. 1, wherein the shaft seal is mounted on a reciprocating shaft, and the shaft seal and subassembly are illustrated in their pre-flexed positions on the left side of the drawing.

A ring and retaining clip subassembly 10 is illustrated in FIG. 1. The subassembly 10 is particularly intended to be used with a shaft seal 20, as indicated in FIG. 2.

The subassembly 10 includes a lubricating ring 12 and a retaining clip 14. The lubricating ring 12 absorbs and retains a lubricant or oil that is adjacent the shaft seal 20. Lubricant from the lubricating ring 12 allows the shaft seal 20 to operate in non-lubricated (dry) and/or poorly lubricated environments without generating high sealing lip breakaway, dynamic friction, temperature, squeaking, and wear that could otherwise occur.

The lubricating ring 12 can be formed from any desired material that wicks-up and retains oil or other lubricating fluids. An inner diameter of the lubricating ring 12 is preferably an interference fit (and may range to a clearance fit) with a mating shaft 30, so that lubricant is imparted to the shaft 30. The shaft 30 can reciprocate and/or rotate within a housing 32. An outer diameter of the lubricating ring 12 is preferably an interference fit with the retaining clip 14 to provide radial location. Physical characteristics of the lubricating ring 12, such as inner diameter/outer diameter concentricity, interference levels, thickness and geometry, are preferably sized to optimize the retention and delivery of lubricant.

The retaining clip 14 can be formed from any desired material that offers sufficient rigidity to retain and locate the retaining clip 14 to the shaft seal 20. The retaining clip 14 may include a first arm 16 that is bent over the lubricating ring 12 in such a manner that a cavity or void 18 is formed between the arm 16 and the lubricating ring 12. The cavity 18 forms a reservoir for oil that is in fluid communication with the lubricating ring 12. The retaining clip 14 can incorporate various features such as undercuts, snap together features, etc. to provide desired axial and radial positioning.

The shaft seal 20 also includes a sealing lip 22 that sweeps away debris and prevents the accumulation of contaminants. The sealing lip 22 is angled slightly outward away from the shaft seal 20 to eliminate a void that could act as a depository for debris. The sealing lip 22 can deflect and follow motions of the shaft 30, and continue to maintain its seal against the shaft 30.

The ring and retaining clip subassembly 10 provides localized lubrication for an area that is typically without lubricant or only marginally lubricated, thus enhancing the sealing functions and service life of the shaft seal 20.

Improvements in breakaway and dynamic friction are provided by the subassembly 10, as well as reductions in noise and wear associated with non-lubricated (dry) and/or inconsistently lubricated environments. The subassembly 10 also prevents contamination or debris from collecting adjacent to the seal 20.

Figure 3:
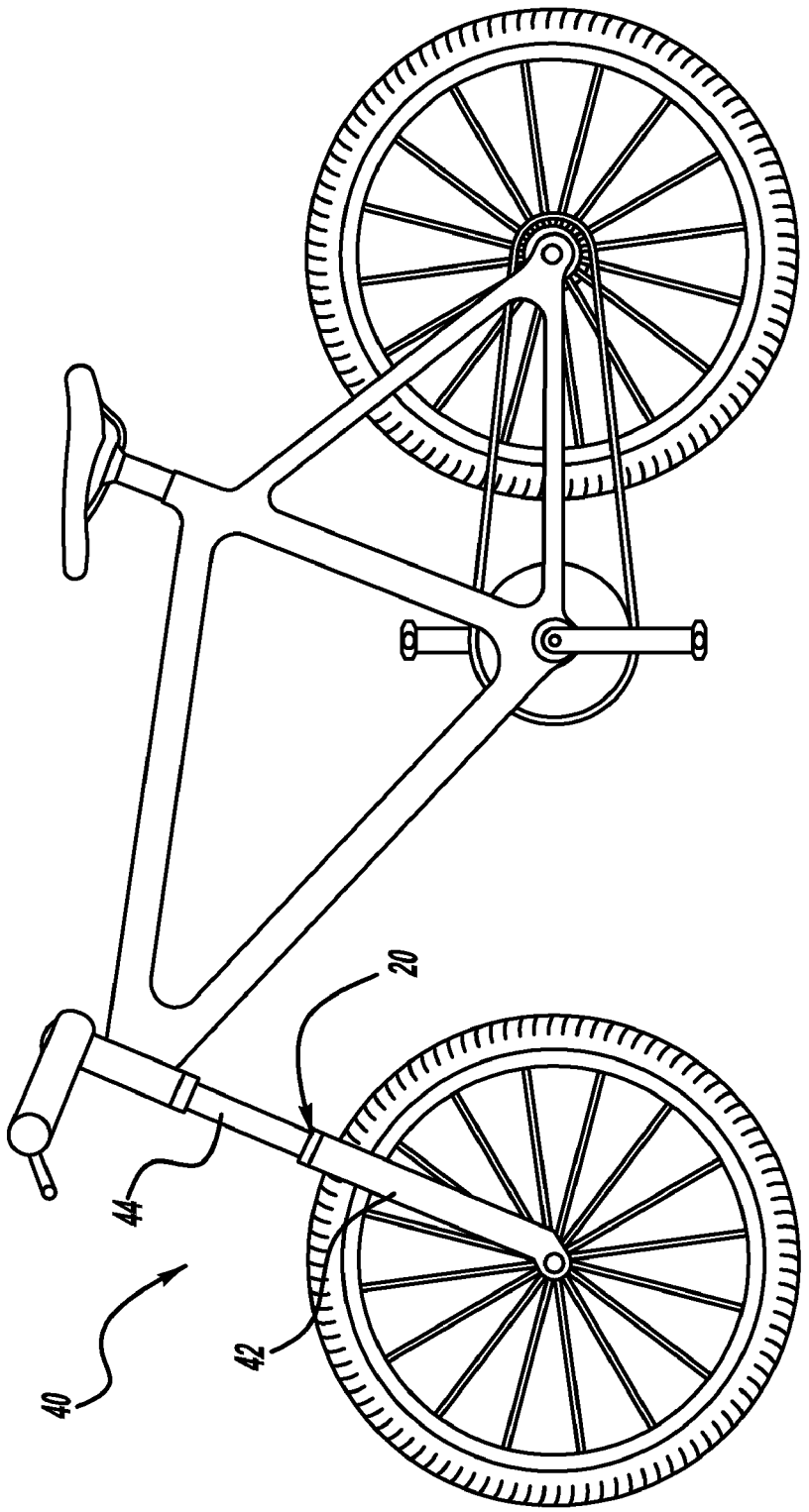
FIG. 3 is a plan view of a mountain bike having a suspension fork with the shaft seal of FIG. 2.

A bicycle, such as a mountain bike, is indicated at 40 in FIG. 3. The bike 40 includes a suspension fork 42 that receives a reciprocating shaft 44. The shaft seal 20 incorporating the subassembly 10 is used with the suspension fork 42 to retain lubricant for the shaft 44.

Figure 4:
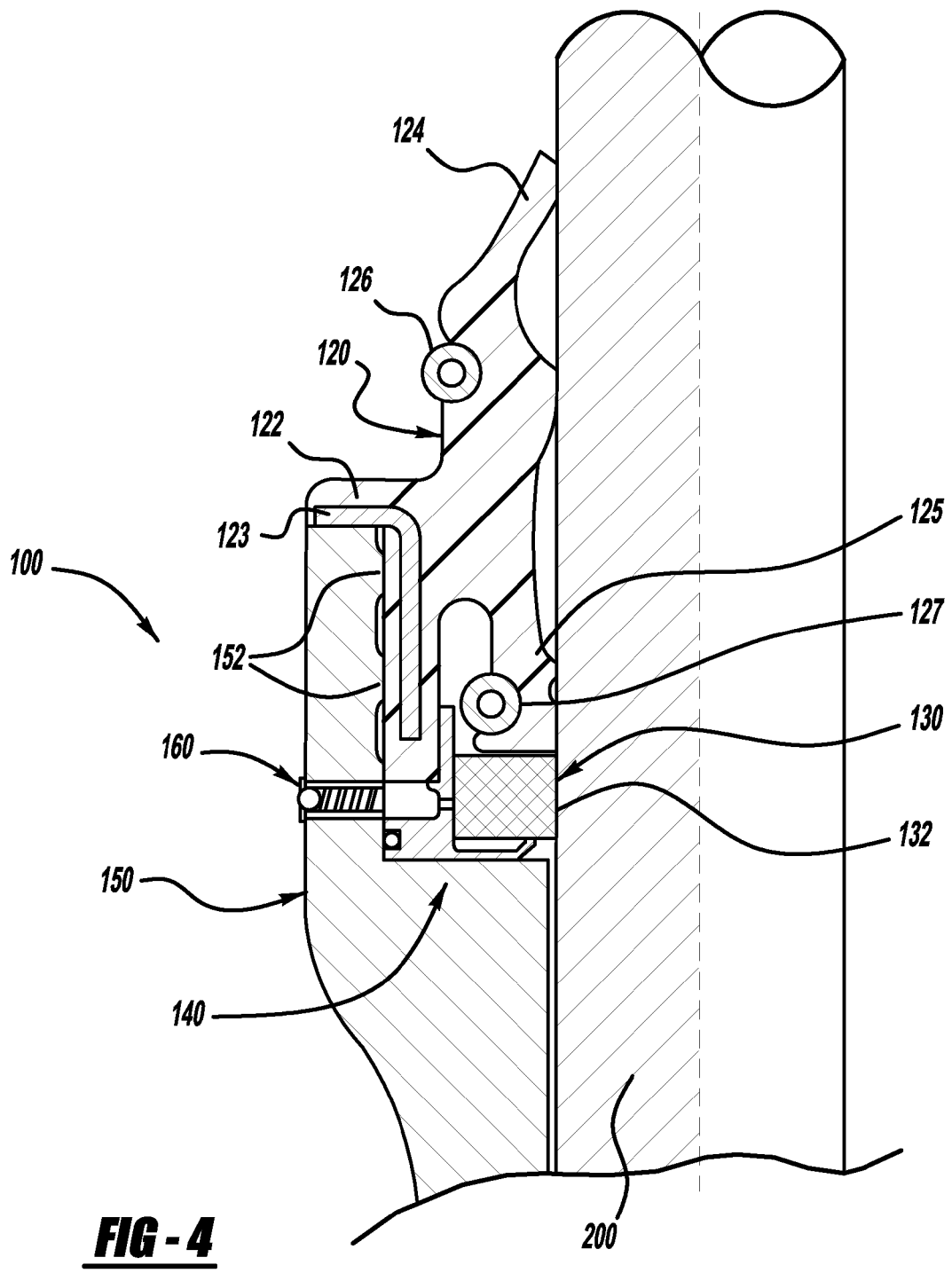
FIG. 4 is a sectional view of a portion of a second embodiment of a shaft seal assembly according to the present invention mounted on a reciprocating or rotating shaft.
Figure 5:
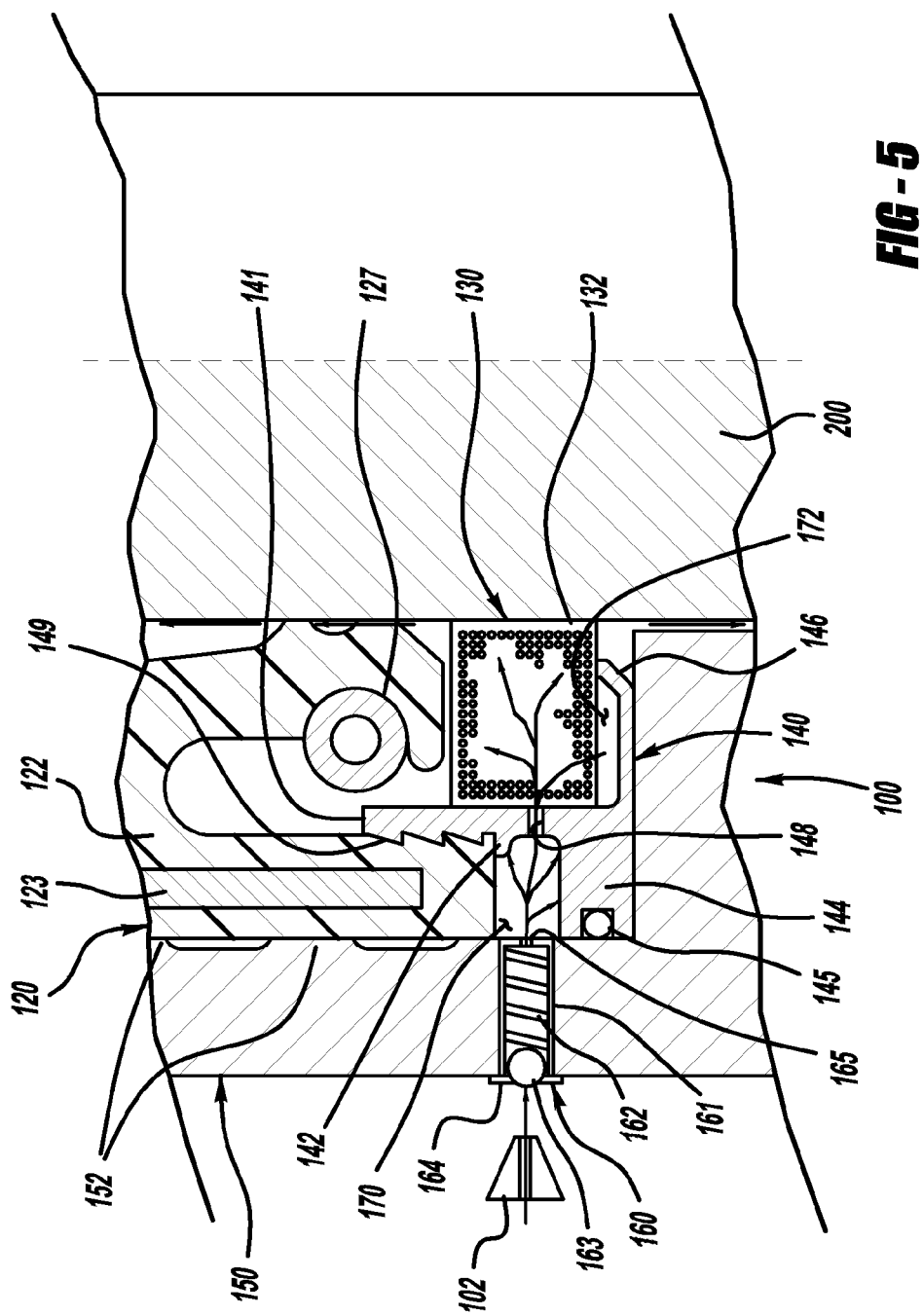
FIG. 5 is an enlarged portion of the shaft seal assembly of FIG. 4 wherein arrows indicate the path of lubricant through the shaft seal assembly.

A second embodiment of a lubricating shaft seal assembly, indicated generally at 100, is illustrated in FIGS. 4 and 5. The seal assembly 100 is particularly designed for use with a reciprocating or rotating shaft 200.

The shaft seal assembly 100 includes a shaft seal 120, a lubricant-storing ring 130, a retainer 140, a housing 150, and an injector valve 160.

The shaft seal 120 includes an elastomeric material 122 formed onto an insert 123. The elastomeric material 122 includes a first engagement portion 124 and a second engagement portion 125 that are in contact with the shaft 200. Springs 126 and 127 can be used to enhance the preload or engagement of the shaft seal 120 onto the shaft 200.

The lubricant-storing ring 130 can be formed from any desired material that wicks-up and retains lubricant, such as foam. Preferably, the ring 130 is formed as an annular member (in one or more pieces) than has an inner circumferential surface 132 in contact with the shaft 200.

The retainer 140 preferably includes an annular wall 141 (see FIG. 5) having a first outer flange 142, a second outer flange 144, an inwardly projecting skirt 146, and a port 148. The first outer flange 142 engages the shaft seal 120. The second outer flange 144 can terminate in a seal 145 such as an O-ring. The skirt 146 engages and supports the ring 130. The port 148 can be formed between the first flange 142 and the second flange 144. Ribs 149 can also be formed on the wall 141 for engagement with the shaft seal 120.

The annular housing 150 is fitted about a portion of the shaft seal 120 and the retainer 140. Elements such as rigs 152 can be formed on the housing 150 for engagement with the shaft seal 120 and vice versa. The seal 145 of the retainer 140 engages the housing 150.

The injector valve 160 can be formed on a ball check valve having a casing 161, a spring 162, a ball 163, and an end stop 164. The injector valve 160 is preferably press-fit into an opening formed in the housing 150.

A first reservoir 170 is bounded by the housing 150, the shaft seal 120, and the retainer 140. Lubricant is injected into the injector valve 160 by any desired means, including an injector 102. The ball 163 is moved away from the end stop 164 so that fluid can pass through a port(s) 165 in the casing 161 to the reservoir 170.

Fluid in the reservoir 170 travels through port(s) 148 in the retainer 140 to the ring 130. The ring 130 includes internal cavities or pockets that receive and store lubricant. Excess fluid is stored in a second reservoir 172 bounded by the ring 130 and the skirt 146 of the retainer 140.

The reservoirs 170 and 172 provide storage of lubricant. This lubricant ensures the saturation of the ring 130, which in turn lubricates the shafts 200 and shaft seal 120.

The shaft seal assembly 100 provides localized lubrication for an area that is typically only marginally lubricated or completely void of lubrication. This localized lubrication enhances the sealing functions and service life of the shaft seal 120. The shaft seal 120 operates in a consistently lubricated environment, resulting in low sealing lip breakaway and dynamic friction, low operational temperature generation, low sealing lip wear, and reduced occurrence of seal "squeak," which is typical of non-lubricated (dry) and/or inconsistently lubricated environments.

With reference to FIGS. 6-8, a third embodiment of a shaft seal assembly 300, according to the principles of the present invention, will now be described. The shaft seal assembly 300 includes a shaft seal 320 formed of an elastomeric material formed onto an insert 323. The elastomeric material includes a first engagement portion 324 and a second engagement portion 325 that are intended to be in contact with a shaft. Springs 126 and 127 are used to enhance the preload or engagement of the shaft seal 320 onto the shaft.

A lubrication storing ring 330 formed from a foam material or sponge-like material is joined to the seal 320 by an elastomeric retainer 332 which can be integrally molded to the seal element 320 or otherwise attached and/or bonded to the seal element 320. The retainer 323 is formed as an annular ring-shaped member with a mounting portion 334 for mounting the retainer 332 to the over-molded insert portion 323 of the seal member 320. The retainer 332 also includes a radially inward extending flange portion 336 which defines a channel 338 and which axially supports the ring-shaped lubricant-storing ring 330. Lubricant can be injected into the seal assembly through the injector assembly 340 (best shown in FIGS. 6 and 8) which is inserted into the bore 342 of the shaft seal 320.

The injector assembly 340 includes an injector tube 344 extending from a body portion 346 and communicating with an interior space 348 provided between the second engagement portion 325 and the insert 323. Thus, lubricant injected through the injector assembly 340 travels through the space 348 and is absorbed by the lubricant-storing ring 330 while additional lubricant can be stored in a channel 338. The injector assembly 340 includes retention tabs 350 provided on the body 346 along with a threaded head portion 352 which threadably receives a cap 354. An external clip 356 extends from the body 346 and engages a shoulder 358 of the seal 320.

It should be noted that the retainer 332 can be integrally formed with the seal 320 or can be bonded or otherwise attached thereto as a secondary process. The lubricant-storing ring 330 likewise can be inserted into the retainer 332 after molding, or can be inserted prior to molding or bonding of the retainer 332 with the shaft seal 320. The injection assembly allows for frequent and convenient addition of lubrication to the foam ring 330 which absorbs and retains the lubrication local to the seal element 320. The seal 320 thus operates in a consistently and sufficiently lubricated environment resulting in low sealing lip breakaway and dynamic friction, low operating temperature, low sealing lip wear, and reduced occurrence of sealing lip squeak which is typical of an insufficiently lubricated seal.

Figure 9:
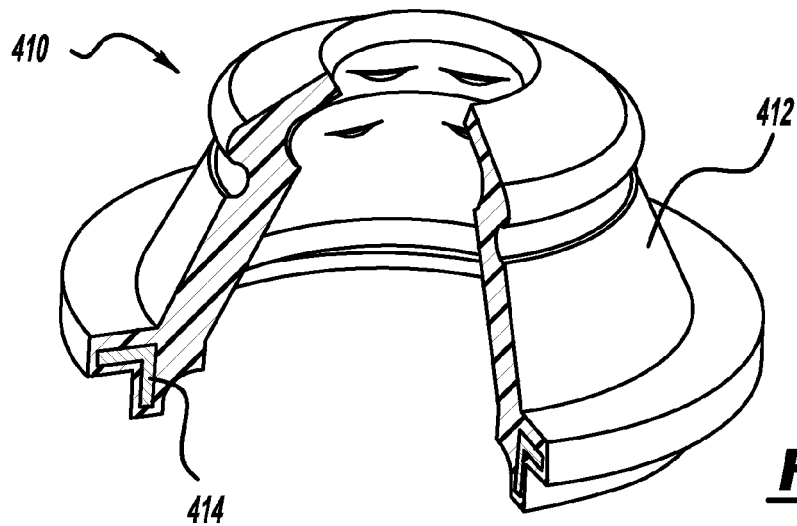
FIG. 9 is a partially cut-away perspective view of a seal assembly in accordance with the principles of the present invention.
Figure 10:
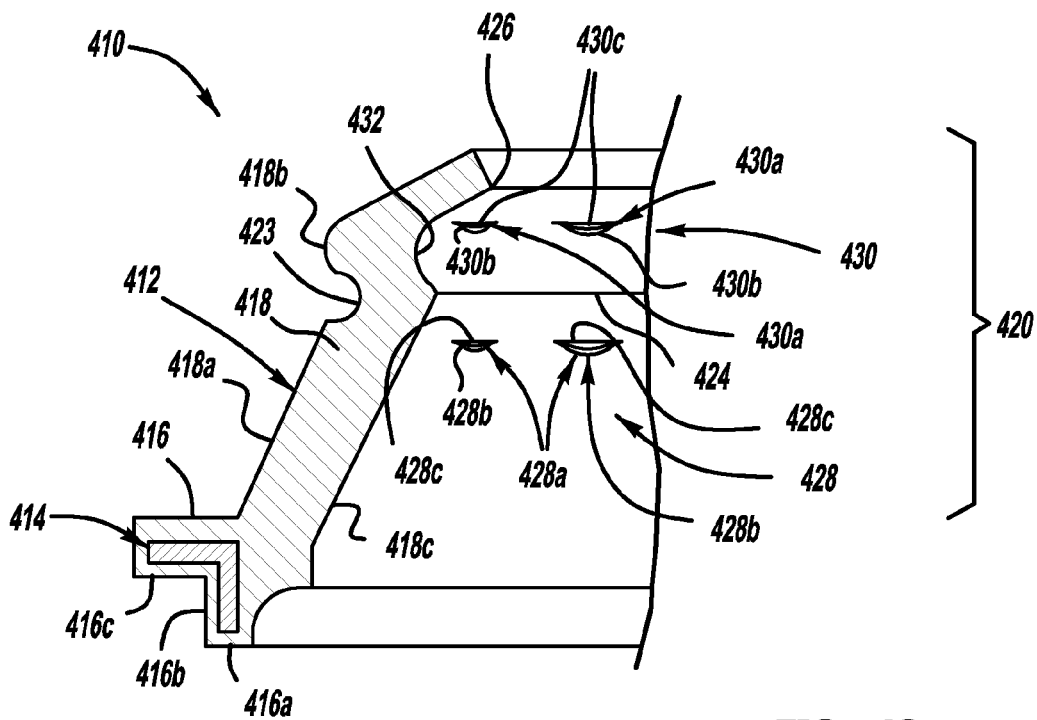
FIG. 10 is a cross-sectional view of the seal assembly of FIG. 9.

With reference to FIGS. 9 and 10, a seal assembly 410 in accordance with the present invention is described. The seal assembly 410 generally includes an annular sealing member 412 and an annular support member 414.

The annular sealing member 412 includes a support portion 416, a body portion 418, and a sealing portion 420. The support portion 416 has a generally inverted L-shaped cross-section that defines a first support surface 416a, a second support surface 416b, and a third support surface 416c. The support surfaces 416a, 416b, 416c are adapted to engage a portion of a cylinder, which will be described in more detail below. The annular support member 414 is a one-piece member having a generally inverted L-shaped cross section. The annular support member 414 is embedded within the support portion 416 and adds structural integrity to the sealing member 412.

The body portion 418 includes an external radial surface 418a, an external shoulder surface 418b, an internal radial surface 418c, and an external annular groove 423. The body portion 418 provides the necessary axial and radial transition between the support portion 416 and the sealing portion 420. Additionally, the external annular groove 423 is adapted to be engaged by a retaining device such as a garter spring, which will be described in more detail below.

The sealing portion 420 of the annular sealing member 412 includes an intermediate sealing lip 424, an end sealing lip 426, an intermediate pocket portion 428, an end pocket portion 430, and an internal annular groove 432 disposed between the intermediate and end sealing lips 424, 426. The intermediate pocket portion 428 includes a plurality of pockets 428a, each having a cup-shaped rim 428b defining an opening 428c. The openings 428c open toward the intermediate sealing lip 424. The rims 428b are adapted to sealingly engage a shaft. The end pocket portion 430 also includes a plurality of pockets 430a, each having a cup-shaped rim 430b defining an opening 430c. The openings 430c open toward the end sealing lip 426. The rims 430b are adapted to sealingly engage a shaft. In an exemplary embodiment, the cup-shaped rims 428b, 430b follow a discontinuous sinusoidal path. The pockets 428a, 430a have circumferential dimensions substantially greater than their axial and radial dimensions. The pockets 428a, 430a are generally uniformly axially displaced from the intermediate and end sealing lips 424, 426, respectively. The spacing between the pockets 428a, 430a and sealing lips 424, 426 is based upon the specific design utilized.

In the embodiment illustrated, the plurality of pockets 428a in the intermediate pocket portion 428 are projections extending radially inward from the internal radial surface 418c of the body portion 418 of the annular sealing member 412. The end pockets 430a are projections extending radially inward from the internal annular groove 432 of the annular sealing member 412. It is envisioned that the annular sealing member 412 and the pockets 428a, 430a are constructed of a deformable, oil-resistant material such as nitrile rubber, or hydrogenated nitrile rubber. It should be appreciated, however, that any flexible, oil-resistant material capable of providing a hydraulic seal is intended to be within the scope of the present invention. It is further envisioned that the annular support member 414 is constructed of a material that is more rigid than the annular sealing member 412 such as metal. It should be appreciated, however, that any material suitably more rigid than the annular sealing member 412 and capable of supporting the annular sealing member 412 under axial and/or radial loading is intended to be within the scope of the present invention.

Figure 11:
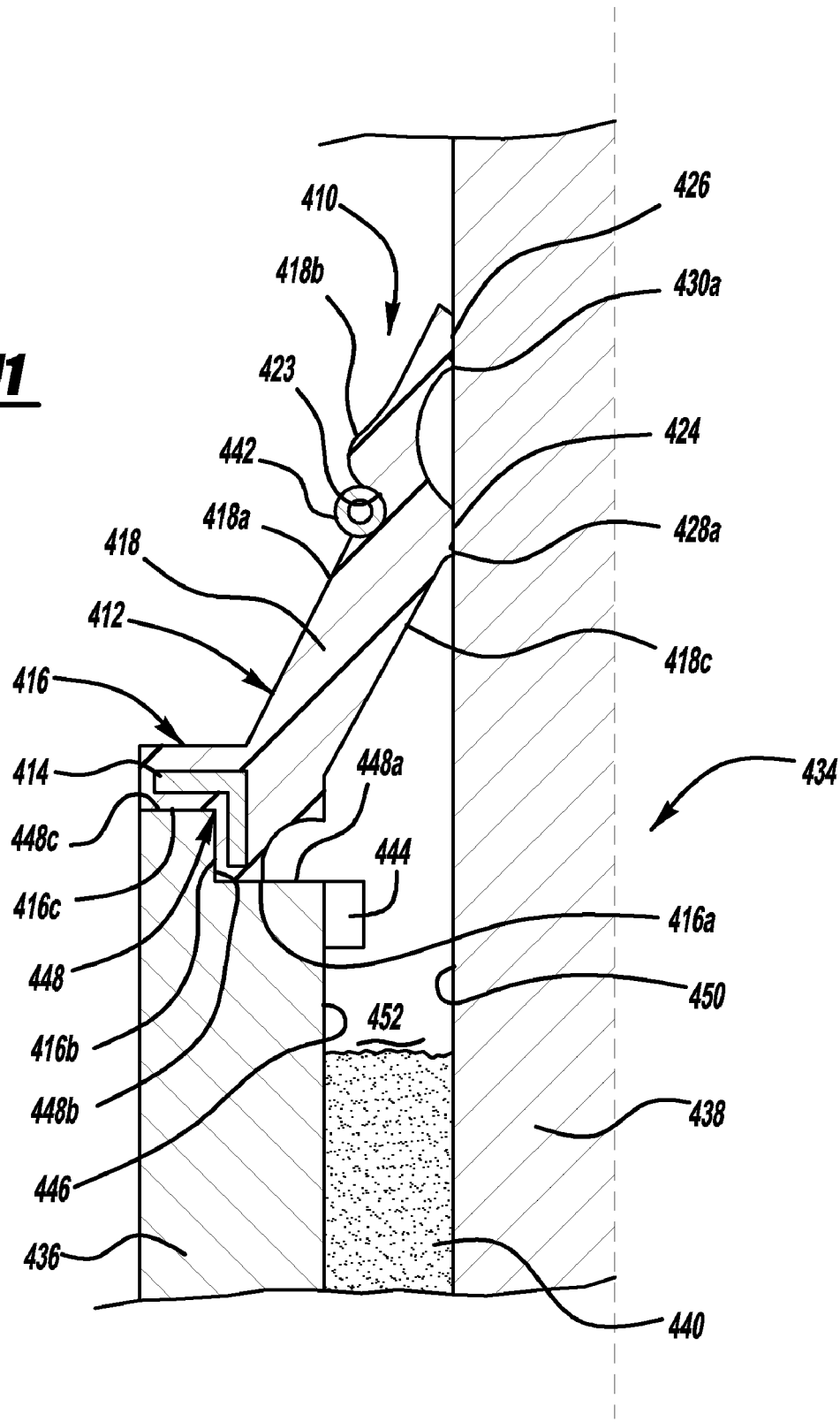
FIG. 11 is a partial cross-sectional view of a seal assembly and a reciprocating shaft assembly in accordance with the principles of the present invention.

FIG. 11 depicts a seal assembly 410 in accordance with the present invention assembled onto a reciprocating shaft assembly 434. The reciprocating shaft assembly 434 generally includes a cylinder portion 436, a shaft 438, a fluid bath 440, a retaining device 442, and a bushing 444. The shaft 438 is adapted to axially reciprocate within the cylinder portion 436 while the seal assembly 410 provides sealing engagement therebetween. Upon the shaft 438 displacing upward, fluid is drawn from the fluid bath 440 to lubricate the sealing lips 424, 426 of the seal assembly 410.

The cylinder portion 436 includes an internal cylindrical surface 446 and an upper shelf 448. The upper shelf 448 supports the seal assembly 410 and includes a first shelf surface 448a, a wall surface 448b, and a second shelf surface 448c. The first shelf surface 448a engages the first support surface 416a on the support portion 416 of the annular sealing member 412. The wall surface 448b engages the second support surface 416b on the support portion 416 of the annular sealing member 412. The second shelf surface 448c engages the third support surface 416c on the support portion 416 of the annular sealing member 412. In an exemplary embodiment, the support portion 416 is adhered to the upper shelf 448 with an adhesive such as epoxy. In an alternative embodiment, the support portion is fixed to the upper shelf 448 with a fastener, such as a clamp, screws or bolts.

The shaft 438 is adapted for axial displacement relative to the cylinder portion 436. The shaft 438 includes an external cylindrical surface 450. The external cylindrical surface 450 includes a radial dimension smaller than a radial dimension of the internal cylindrical surface 446 of the cylinder portion 436 to define an annular cavity 452. The fluid bath 440 partially fills the annular cavity 452 and is adapted to lubricate the external cylindrical surface 450 of the shaft 438. The fluid bath 440 includes a lubricating fluid such as oil. The retaining device 442 includes a garter spring engaging the external annular groove 423 of the body portion 418 of the annular sealing member 412. The garter spring radially compresses the body portion 418 of the annular sealing member 412. This encourages the sealing lips 424, 426, as well as the pockets 428a, 430a, to sealingly engage the external surface 450 of the shaft 438. The bushing 444 includes a polymer ring and is disposed near the upper shelf 448 of the cylinder portion 436. The bushing 444 provides for a low friction tolerance radial fit between the shaft 438 and the cylinder portion 436.

Figure 12:
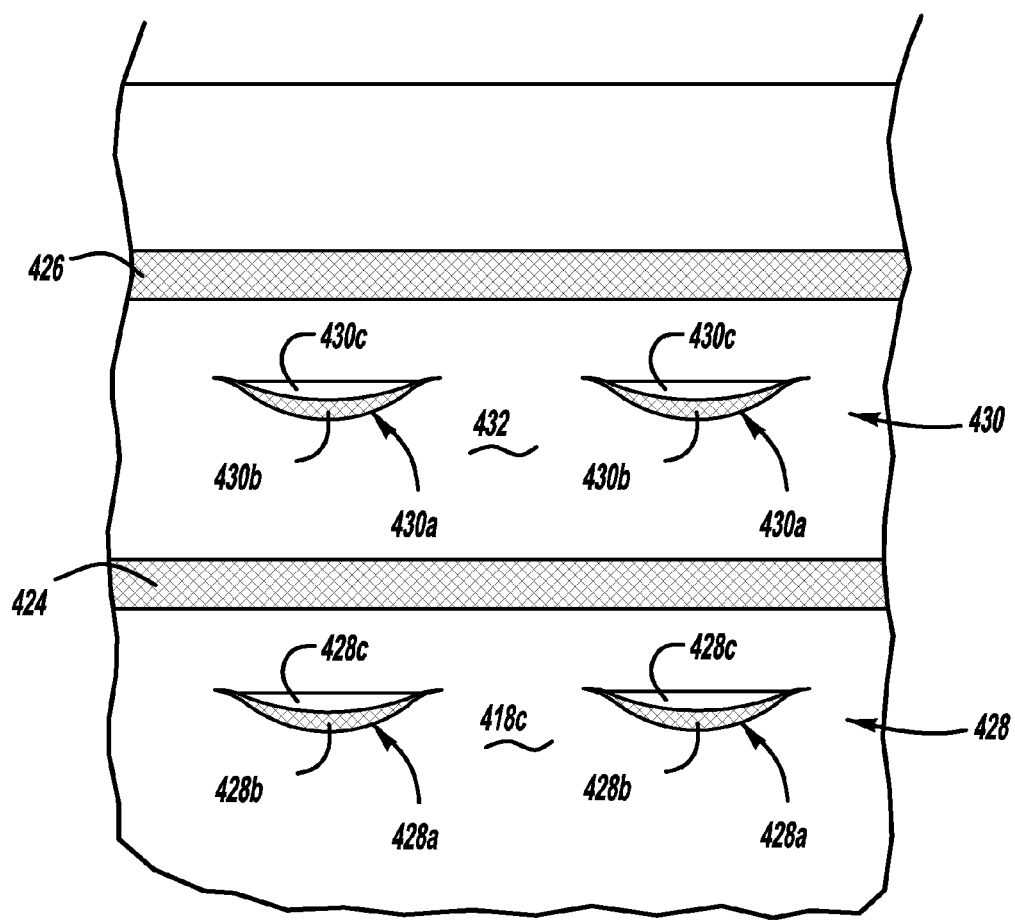
FIG. 12 is an illustrative view of the interior surface of the seal assembly of FIG. 11.

FIG. 12 illustrates the intermediate sealing lip 424, end sealing lip 426, intermediate pocket portion 428, and end pocket portion 430 as if the seal assembly 410 is assembled onto the shaft 438 as shown in FIG. 11. The intermediate and end sealing lips 424, 426 are compressed onto the shaft 438 (not shown) by the retaining device 442 (not shown). This slightly deforms the lips 424, 426 to define substantially uniform axial sealing contact dimensions. In an exemplary embodiment, the intermediate and end sealing lips 424, 426 have the same axial sealing contact dimensions. In an alternative embodiment, the intermediate 424 and end 426 sealing lips have different axial sealing contact dimensions. The cup-shaped rims 428b, 430b of the pockets 428a, 430a are also compressed onto the shaft 438 by the retaining device 442. This provides the necessary engagement between the pockets 428a, 430a and the shaft 438 to manage the flow of the lubricant in accordance with the principles of the present invention.

Figure 13A:
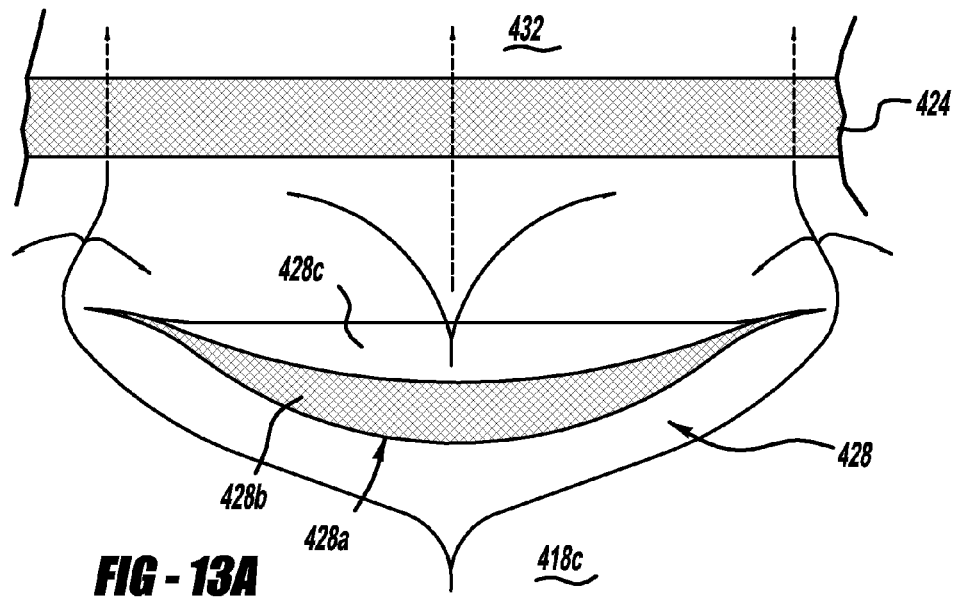
FIGS. 13A-13B are illustrative views of a sealing lip and pocket of the seal assembly of FIG. 11 illustrating the flow paths of a lubricant.
Figure 13B:
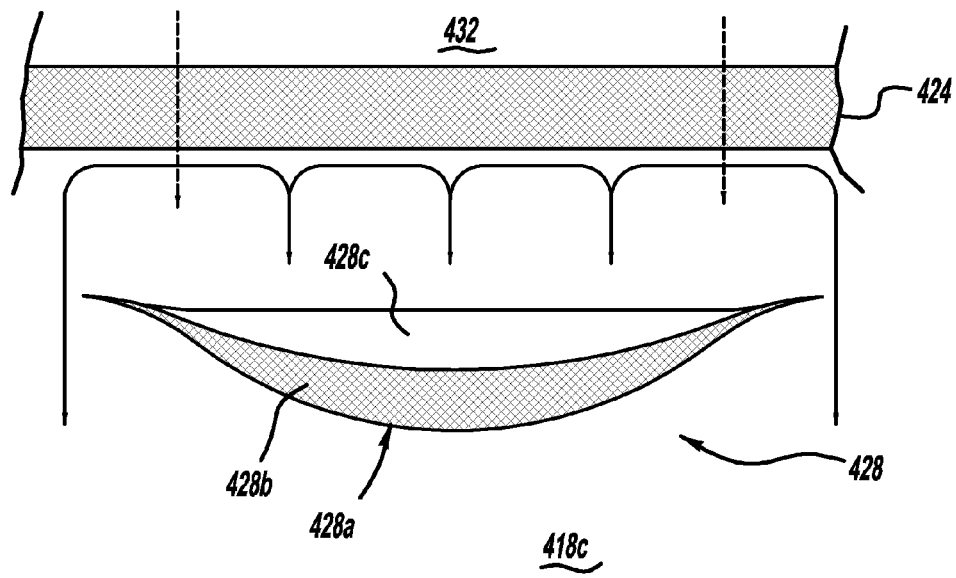

FIGS. 13A and 13B illustrate the flow of the lubricant in the intermediate pocket portion 428 while the shaft 438 axially reciprocates within the cylinder portion 436. For the sake of brevity, FIGS. 13A and 13B illustrate the fluid flow in accordance with a single pocket 428a. It should be appreciated that each of the pockets 428a, as well as pockets 430a, perform in a similar manner.

FIG. 13A illustrates the fluid path upon upward displacement of the shaft 438 relative to the cylinder portion 436. During such upward displacement, the shaft 438 further compresses the rim 428b to reduce a radial dimension of the pocket 428a. This forces the fluid out. The fluid exits the opening 428c of the pocket 428a as indicated by the arrows. Additionally, fluid is drawn from the fluid bath 440, shown in FIG. 11, along the external cylindrical surface 450 of the shaft 438. The fluid drawn from the bath 440 deflects around the pockets 428a toward the intermediate sealing lip 424. A portion of the fluid travels axially beyond the intermediate sealing lip 424 and the remainder deflects off of the intermediate sealing lip 424. The portion that travels beyond the intermediate sealing lip 424 is intended to be a small amount only to lubricate the opposite side thereof. The majority of the fluid is deflected by the intermediate sealing lip 424. The deflected portion gravitates either into the pocket 428a or down the internal radial surface 418c of the annular sealing member 412 or external cylindrical surface 450 of the shaft 438 toward the fluid bath 440.

FIG. 13B illustrates the fluid path upon downward displacement of the shaft 438. The fluid flows axially away from the intermediate sealing lip 424, as indicated by the arrows. A portion of the fluid is collected by the pocket 428a, thereby forming a fluid reservoir. The remainder travels down the internal radial surface 418c of the annular sealing member 412 or the external cylindrical surface 450 of the shaft 438 toward the fluid bath 440.

FIG. 13A illustrates an important advantage of the above-described design. The shaft 438 must only displace a short distance upward to extract fluid from the pockets 428a, 430a and lubricate the sealing lips 424, 426. This is highly beneficial to the performance of the seal assembly 410 following a period of idle. During idle, the fluid tends to gravitate away from the sealing lips 424, 426 and toward the fluid bath 440. This leaves the sealing lips 424, 426 dry. The plurality of pockets 428a, 430a of the present invention alleviate this problem by storing fluid in close proximity to the sealing lips 424, 426. This greatly decreases the distance required for the shaft 438 to displace in order to supply lubricant thereto. Thus, the current invention provides a self-lubricating seal assembly 410 that reduces the effects of friction, operating temperature, lip abrasion, and audible noise upon start up after a period of idle.

Figure 14:
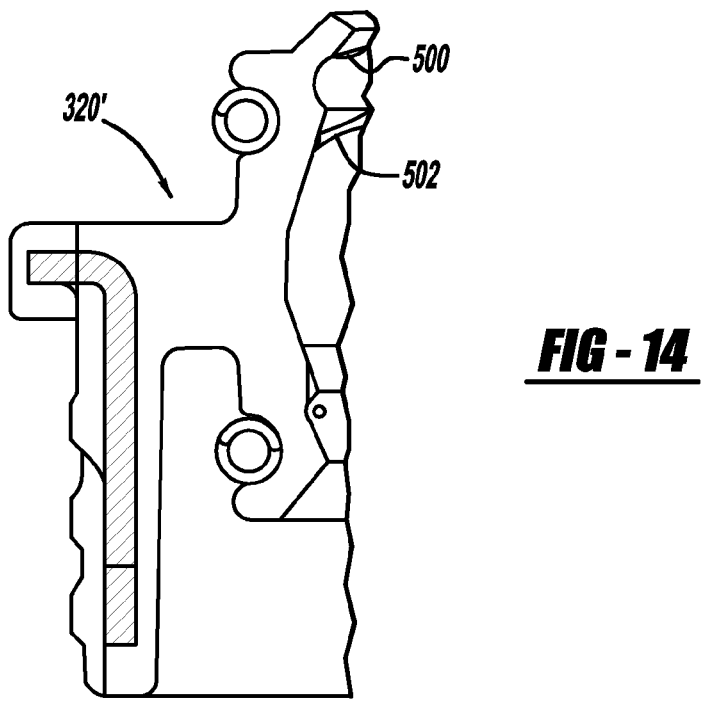
FIG. 14 is a cross-sectional view of a shaft seal of the type illustrated in FIG. 6 and incorporating the lubricating pockets according to the principles of the present invention therein.
Figure 15:
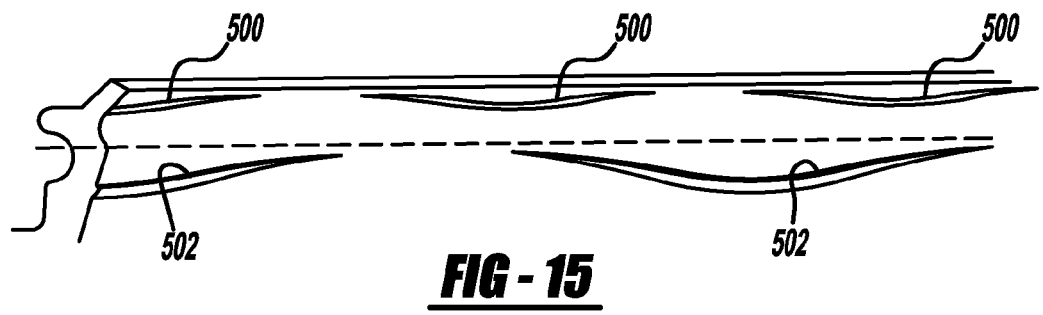
FIG. 15 is a plan view of the interior lubrication pockets provided in the shaft seal of FIG. 14.

FIGS. 14 and 15 illustrate the incorporation of lubrication pockets 500, 502 on the interior surface of the shaft seal 320 as illustrated in FIGS. 6 and 7. The lubricant pockets 500, 502 function in the same manner as the pockets 428, 430 as described above. The lubricant pockets 500, 502 can be utilized in combination with the lubricant-storing ring 330, as illustrated in FIG. 6, in order to provide a much improved lubrication system for lubricating the interface between the shaft seal 320 and shaft 200.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hydraulic seal, comprising:
an annular body portion extending from a first axial end at an oil side to a second axial end at an air side in a first axial direction such that an outer surface of the annular body portion has a diameter which decreases from the first axial end to the second axial end;
a first sealing lip portion located at the second axial end and adapted to sealingly engage a shaft; and
a first pocket having an opening facing toward the first sealing lip portion and adapted to collect a working fluid when the shaft axially displaces in the first axial direction and to dispense the working fluid when the shaft axially displaces in a second axial direction to lubricate the first sealing lip portion.

2. The seal of claim 1 further comprising a biasing mechanism for biasing the first sealing lip portion into sealing engagement with the shaft.

3. The seal of claim 2 wherein the biasing mechanism includes a garter spring engaging an outer surface of the annular body portion.

4. The seal of claim 1 wherein the first pocket includes a rim that defines the opening and follows a discontinuous sinusoidal path.

5. The seal of claim 1 further comprising a second sealing lip portion located at the second axial end and axially disposed from the first sealing lip portion opposite the first pocket.

6. The seal of claim 5 wherein said first and second sealing lip portions have substantially uniform axial sealing contact dimensions.

7. The seal of claim 5 further comprising a second pocket having an opening facing toward the second sealing lip portion and adapted to collect the working fluid when the shaft axially displaces in the first axial direction and to dispense the working fluid when the shaft axially displaces in the second axial direction to lubricate the second sealing lip portion.

8. The seal of claim 1 further comprising an annular support member embedded in the annular body portion at the first axial end.

9. The seal of claim 1 wherein the first pocket extends into an inner radial surface of the annular body portion.

10. The seal of claim 1 wherein the opening faces the air side of the seal.

11. A reciprocating shaft and hydraulic seal assembly, comprising:
a cylinder portion;
a shaft disposed in the cylinder portion; and
a hydraulic seal including an annular body portion extending from a first axial end at an oil side to a second axial end at an air side in a first axial direction such that an outer surface of the annular body portion has a diameter which decreases from the first axial end to the second axial end,
a first sealing lip portion located at the second axial end and sealingly engaging the shaft, and
a first pocket having an opening facing toward the first sealing lip portion to collect a working fluid when the shaft axially displaces in the first axial direction and dispense the working fluid when the shaft axially displaces in a second axial direction to lubricate the hydraulic seal.

12. The shaft and hydraulic seal assembly of claim 11 further comprising a biasing mechanism for biasing the first sealing lip portion into sealing engagement with the shaft.

13. The shaft and hydraulic seal assembly of claim 12 wherein said biasing mechanism includes a garter spring engaging an outer surface of the annular body portion.

14. The shaft and hydraulic seal assembly of claim 11 wherein the first pocket includes a rim that defines the opening and follows a discontinuous sinusoidal path.

15. The shaft and hydraulic seal assembly of claim 11 further comprising a second sealing lip portion located at the second axial end and axially disposed from the first sealing lip portion opposite the first pocket.

16. The shaft and hydraulic seal assembly of claim 15 wherein said first and second sealing lip portions have substantially uniform axial sealing contact dimensions.

17. The shaft and hydraulic seal assembly of claim 15 further comprising a second pocket disposed between the first and second sealing lip portions having an opening facing toward the second sealing lip portion and adapted to collect the working fluid when the shaft axially displaces in the first axial direction and dispense the working fluid when the shaft axially displaces in the second axial direction to lubricate the hydraulic seal.

18. The shaft and hydraulic seal assembly of claim 11 further comprising an annular support member embedded in the annular body portion at the first axial end and supporting the hydraulic seal on the cylinder portion.

19. The shaft and hydraulic seal assembly of claim 11 wherein the first pocket extends into an inner radial surface of the annular body portion.

20. The shaft and hydraulic seal assembly of claim 11 wherein the opening faces the air side of the seal.

21. A seal assembly, comprising:
an annular support member; and
an annular sealing member interconnected with the annular support member,
the annular sealing member extending from a first axial end at an oil side to a second axial end at an air side in a first axial direction such that an outer surface of the annular sealing member has a diameter which decreases from the first axial end to the second axial end,
the annular sealing member including a first sealing lip located at the second axial end and adapted to sealingly engage a shaft,
a first plurality of pockets formed on said annular sealing member and each having an opening facing toward the first sealing lip and adapted to collect a working fluid when the shaft axially displaces in the first axial direction and dispense the working fluid when the shaft axially displaces in a second axial direction to lubricate the first sealing lip.

22. The seal assembly of claim 21 further comprising a biasing mechanism for biasing the first sealing lip into sealing engagement with the shaft.

23. The seal assembly of claim 22 wherein said biasing mechanism includes a garter spring engaging an outer surface of the annular sealing member.

24. The seal assembly of claim 21 wherein the first plurality of pockets each include a rim that defines the openings and follow a discontinuous sinusoidal path.

25. The seal assembly of claim 21 further comprising a second sealing lip located at the second axial end and axially disposed from the first sealing lip opposite the first plurality of pockets.

26. The seal assembly of claim 25 wherein the first and second sealing lip portions have substantially uniform axial sealing contact dimensions.

27. The seal assembly of claim 25 further comprising a second plurality of pockets disposed between the first and second sealing lips, each having an opening facing toward the second sealing lip and adapted to collect the working fluid when the shaft axially displaces in the first axial direction and dispense the working fluid when the shaft axially displaces in the second axial direction to lubricate the second sealing lip.

28. The seal assembly of claim 21 wherein the first pocket extends into an inner radial surface of the annular body portion.

29. The seal assembly of claim 21 wherein the opening faces the air side of the seal.

* * * * *